United States Patent [19]

Arazi et al.

[11] Patent Number: 5,212,546
[45] Date of Patent: May 18, 1993

[54] COLOR CORRECTION SYSTEM EMPLOYING REFERENCE PICTURES

[75] Inventors: Efraim Arazi, San Francisco, Calif.; William F. Schreiber, Cambridge, Mass.; Abraham A. Bar, Palo Alto, Calif.

[73] Assignee: Electronics for Imaging, Inc., San Mateo, Calif.

[21] Appl. No.: 582,054

[22] Filed: Sep. 14, 1990

Related U.S. Application Data

[63] Continuation-in-part of Ser. No. 547,074, Jul. 3, 1990, abandoned.

[51] Int. Cl.$^5$ ............................................. G03F 3/08
[52] U.S. Cl. ........................................ 358/80; 358/75
[58] Field of Search ........................ 358/75, 76, 78, 80

[56] References Cited

U.S. PATENT DOCUMENTS

| | | | |
|---|---|---|---|
| 3,778,541 | 12/1973 | Bowker | 356/2 |
| 4,500,919 | 2/1985 | Schreiber | 358/80 |
| 4,583,186 | 4/1986 | Davis et al. | 358/80 |
| 4,646,252 | 2/1987 | Terashita | 358/80 |
| 4,689,669 | 8/1987 | Hoshino et al. | 358/80 |
| 4,694,355 | 9/1987 | Constable | 358/76 |
| 4,694,356 | 9/1987 | Constable | 358/76 |
| 4,763,186 | 8/1988 | Belmares-Sarabia et al. | 358/22 |
| 4,789,892 | 12/1988 | Tsuzuki et al. | 358/80 |
| 4,805,016 | 2/1989 | Kato | 358/80 |
| 4,819,193 | 4/1989 | Imao | 358/80 |
| 4,857,994 | 8/1989 | Belmares-Sarabia et al. | 358/22 |
| 4,866,514 | 9/1989 | Yeomans | 358/76 |
| 4,884,130 | 11/1989 | Huntsman | 358/80 |
| 4,908,701 | 3/1990 | Udagawa | 358/80 |
| 4,929,978 | 5/1990 | Kanamori et al. | 358/80 |
| 4,935,809 | 6/1990 | Hayashi et al. | 358/75 |
| 4,935,818 | 6/1990 | Wang | 358/76 |
| 4,958,221 | 9/1990 | Tsuboi et al. | 358/80 |
| 4,959,712 | 9/1990 | Tsuzuki et al. | 358/80 |
| 4,978,226 | 12/1990 | Moriya et al. | 358/80 |
| 4,979,031 | 12/1990 | Tsuboi et al. | 358/75 |
| 5,012,333 | 4/1991 | Lee et al. | 358/80 |

FOREIGN PATENT DOCUMENTS

0323849A2 12/1989 European Pat. Off. .

OTHER PUBLICATIONS

Schreiber, William F., A Color Prepress System Using Appearance Variables, Journal of Imaging Technology, vol. 12, No. 4, Aug. 1986.

Primary Examiner—Jose L. Couso
Attorney, Agent, or Firm—Robert J. Koch

[57] ABSTRACT

The color correction system will enhance an operator's ability to edit and correct the appearance of a color image. This system is particularly useful in desk-top publishing applications. A reference image with an overall desired visual impression is displayed on a screen. This reference image is known to print in an acceptable fashion and give a desired visual impression. When the image to be corrected is modified in order to approximate the visual impression of a reference picture, then the picture to be corrected should print acceptably.

66 Claims, 4 Drawing Sheets

COLOR CORRECTION SYSTEM EMPLOYING REFERENCE PICTURES

This is a continuation-in-part of U.S. Pat. application Ser. No. 07/547,074, filed Jul. 3, 1990, the disclosure of which is expressly incorporated herein by reference, now abandoned.

BACKGROUND OF THE INVENTION

1. Field of the Invention

The invention relates to color editing systems and particularly to systems employing reference pictures.

2. Description of the Related Technology

Color prepress systems are used to prepare color pictures for printing. Color prepress systems generally include color processing to facilitate production of printing surfaces which are then used for the reproduction of pictures. Offset lithography, letterpress, and gravure are the three most common color printing processes. In all these processes, images are conventionally formed by photographing or scanning the original through three different color filters, normally red, green and blue (R, G and B). These three color components are combined in various ways to produce printing plates or the equivalent thereof, which in turn control the amount of each colorant deposited at each point of the reproduction. The problem common to these processes is that the exact combination of colorants required for the print to match the original is not related, in any simple way, to measurements that can be made on the original The preparation of color pictures for printing involves aesthetic or editorial corrections to compensate for imperfect originals or to achieve some special effect, as well as correction to compensate for properties of the particular inks, paper, and press to be used. In conventional electronic systems, whether or not they are computer-based, aesthetic correction and ink correction are combined together in one "color computer". The operator interface to this module is a large number of knobs (or their computer equivalents), the effects of which are learned through long experience. Most systems provide a convenient way to predict the densities of the final color separations that will eventually be used to make the printing plates. Operators learn to associate these densities with particular colors, in many cases assisted by a color book of printed patches corresponding to a large number of combinations of separation densities. Corrections to achieve the desired color at one point generally affect other colors or colors in other areas of the image or picture. To circumvent the interaction, local color correction uses masks to confine the correction to one object or area of the picture. While good results can be achieved by such conventional systems, they require long experience and are generally slow. For further information on color prepress systems, see *A Color Prepress System Using Appearance Variables* by William F. Schreiber in the Journal of Imaging Technology, 12:200-211, Aug. 4, 1986 incorporated by reference herein.

In view of the disadvantage of conventional prepress systems, U.S. Pat. No. 4,500,919 to William F. Schreiber proposes an improved color processing system. U.S. Pat. No 4,500,919 is expressly incorporated by reference herein. The basic approach taken in U.S. Pat. No. 4,500,919 is complete separation of implementation of aesthetic choices and compensation for ink characteristics. In this mode the operator decides what the output appearance should be. The implementation of these aesthetic choices disclosed may be achieved using a TV display that accurately represents the appearance of the output page and a system permitting interactive adjustment of the output image in terms of its appearance and not of its inks. The compensation for ink and printer characteristics may be implemented in a system that effects precise compensation for ink, paper and press by a transformation from appearance values to colorant values. The transformation may be implemented by a lookup table (LUT) which permits the computation of colorant amounts on the fly during the output process. Entries for the LUT may be computed using data collected from printed color patches. Since ink correction is fully automatic, the operator need have no knowledge of conventional color correction. Consequently, only a short training period is required to get good results. Key features of this improved system include (1) the interactive adjustment of the output image by the operator in terms of its appearance on the TV monitor to achieve aesthetic correction and (2) a conversion of such image to ink in a manner that makes the printed image match the displayed image.

According to an embodiment of above-described system, the cathode ray tube of a display may be accurately calibrated and the viewing conditions carefully set up to control the state of adaptation of the operators visual system to make sure that the display and viewing conditions are consistent and correlated with the appearance delivered by the final printed result. Establishing and maintaining expensive, precisely calibrated displays and viewing conditions are extremely difficult, and otherwise inconvenient. Low cost and convenience are extremely important in desk-top publishing and similar uses by consumers. It is therefore desirable to provide a color correction system which may effectively achieve good results without accurate calibration of displays such as cathode ray tubes in a conventional TV monitor or computer display it is a further object to avoid a requirement for careful control of viewing conditions.

In order better to describe the invention and its relation to the prior art, the following terms are defined at the outset:

Tristimulus Values—The amounts of three primary colored lights, which, when added, produce a visual or "colorimetric" match with an original color. Such a set of primaries includes the red, green, and blue phosphor colors of a TV tube, in which case the tristimulus values are called R, G, and B.

Appearance Signals—Values produced by any reversible transformation of RGB. Luminance/chrominance (LC1C2) and luminance, hue, and saturation (LHS) are two common sets.

Color—The specification of a colored stimulus requiring at least three component values.

Luminance—That aspect of a colored stimulus relating to its intensity.

Hue—That aspect of a colored stimulus relating to its color name.

Saturation—That aspect of a colored stimulus relating to its purity or absence of contamination with white.

Chrominance—That aspect of a colored stimulus relating to its hue and saturation. The saturation is approximately the ratio of chrominance amplitude to luminance.

Color Space—A three-dimensional space in which each point corresponds to a color, including both luminance and chrominance aspects. RGB forms such a space. LHS forms a set of cylindrical coordinates in color space. The L-axis is the diagonal of RGB space, so that L=0 where R=G=B=0, and L=max where R, G, and B are max The C1C2 plane is perpendicular to the L-axis in LC1C2 space The hue (angle) and chrominance (amplitude) are polar coordinates in the C1–C2 plane.

Lightness—A non-linear transformation of luminance in which equal increments are equally perceptible.

Density—The negative logarithm, to the base ten, of the reflectance or transmittance of a point in an image. In the case of colored inks or dyes, the density is measured through an appropriate color filter. The density is approximately proportional to the quantity of ink laid down. CMYK refer to the densities of cyan, magenta, yellow, and black ink normally used in printing.

Gamut—The range of colors reproducible with a set of inks, lights, or other colorants. The gamut can be conveniently described in terms of a particular region of a color space.

Memory Color—Specific colors which are generally known to viewers and for which most viewers have an absolute memory. The red of a Coca-Cola can or color of a well known sports team's uniforms are examples of memory colors.

SUMMARY OF THE INVENTION

According to the invention the system may be utilized in the color reproduction field. The invention is intended to provide a mechanism which will allow a relatively untrained operator to achieve significantly enhanced color reproduction results in printer applications and copiers.

It is an object of the invention to ease the skill level and effort required to obtain good color reproductions.

It is a further object to enhanced the results which could previously be obtained by color correction or aesthetic modification of images.

It is a further object to provide a color editing system that does not require precise calibration of the display and that can be used in a normal viewing environment. It is further highly desirable to facilitate the comparison of pictures that will be printed near each other on the page so that their overall visual impressions will be comparable.

According to an advantageous feature of the invention, the editing system is independent of the picture production unit. A wide variety of different color printing systems may be used with a minimum of tailoring to the specific characteristics of the system. The same color editing system ma be used with many different computer-based printing systems, a property sometimes called device independence.

Device independence in this invention may be achieved by careful standardization of the editing and printing system interfaces. Standardization between the editing system and the source of input image data may be helpful; however, such standardization may not be commercially practicable in available scanner technology. The lack of such standardization may be compensated for by the editing system according to the invention. This minimizes the amount of information about the printing system which must be incorporated into the editing system in order to control the amount of colorants deposited on the final page in relationship to the tristimulus values of the desired color.

There are two physical editing system interfaces. One is the port through which input image data is received. The other is the port through which output image data is transmitted to the printing engine. Standardizing the first port requires setting the file format for the input pictures and the relationship between the image data and tristimulus values. Image data preferably is the tristimulus values defining the input color. If these values are not accurate, representation of the colors of the original image may not be correct. According to the invention, acceptable output pictures may still be obtained.

Standardization of the output port requires implementing a transformation between tristimulus values of a color, i e., the data in the image file in the editing system, and the amount of each colorant to be deposited on the final page by the printing engine so as to produce a color with the same appearance. This transformation may be implemented in a lookup table, the contents of which may be derived from measurements made on a plurality of color patches printed by the printing engine. See U.S. Pat. No. 4,500,919. The printing engine should be sufficiently stable so that the relationship between the signals transmitted to it from the editing system and the density of the colors actually deposted on the page is quite similar to what it was at the time the color patches were printed to establish the parameters of the appearance-to-colorant conversion.

Another piece of information about the printing engine that may be advantageously used in the editing system pertains to its gamut. When editing an image, it is advantageous if the operator knows when colors exist in the image file that exceed the gamut of the printing engine and therefore cannot be accurately reproduced. This information in actually a subset of the information in the LUT used to convert tristimulus values to amounts of colorants. Whenever the theoretical amount of colorant called for is negative or exceeds the maximum amount available, the color is nonprintable. This information may be displayed to the operator of the editing system by means of a characteristic indication on the display. The out-of-gamut colors may be indicated by a display flicker or the area may be outlined or otherwise highlighted or indicated on the screen.

According to the invention, precise calibration of the cathode ray tube or other display control of viewing conditions, although preferable, is not essential. A reference picture may be displayed along with an input picture to be corrected where the printing engine has been initialized or calibrated so that the reference picture will print an acceptable image according to some predetermined standard. The picture to be corrected will print correctly, according to the predetermined standard after it is adjusted to exhibit the same overall visual impression, on the display, as the reference picture on the same display. Comparing a picture to be corrected to a reference picture has the additional advantage that the picture to be corrected is compared to a reference picture as a whole instead of to color patches.

In desk-top publishing and other low-cost or non-highly-professional applications, the primary requirement of a color correction system is that the picture reproduced is not noticeably different in overall visual impression from the original or from a reference picture. This is very different from the requirement in commercial printing where a very precise match is required for particular colors. In other words, in desktop publishing, even though the match between particular colors of two pictures is not precise, the overall visual impression of the two pictures ma still be acceptable to ordinary observers. The color correction system of this invention permits the operator to choose a reference picture having appropriate subject matter and characteristics against which the picture to be corrected is matched on the same display. The appearance value representation of the picture to be corrected is then modified so that the displayed image of the picture to be corrected and that of the reference picture have the same overall visual impression. Since the color correction system and the colorant selection mechanism have been calibrated so that the reference picture is known to print acceptably according to a preset standard, the picture to be corrected, after it has been adjusted in comparison to the reference picture on a display, will also print acceptably to the same standard. In other words, even though the display system has not been accurately calibrated and viewing conditions have not been controlled so that the image display will match their reproduced image in print, the corrected picture will print acceptably.

Another important consideration is that pictures which will appear on the same page must give the viewer a consistent visual impression and "look right". When proximate pictures give a consistent visual impression they are said to be "comparable". A comparable visual impression can be achieved, according to the invention, by using one of the pictures to be printed as the reference image for correcting the other pictures.

Advantageously the image storage to display paths for the reference picture and the picture to be corrected should be the same to the greatest extent possible. Maintaining the same paths insures a match of the visual impression of a printed image when there is a match of the visual impression of displayed images. In the case of digital signal paths and processing, the respective treatment of the picture to be corrected and the reference image should be logically equivalent. An analog portion of the path should be through identical components wherever possible.

Maintaining the same signal paths insures that the reference image and the image to be corrected each undergo the same distortions Distortion of displayed picture and reference picture should be the same. If visual impressions of the reference picture and the picture to be corrected is the same on a distorted display then the results will be equivalent when printed. In this fashion acceptable results are achieved even though there is distortion in a display or signal path.

The apparatus of this invention is for correcting a picture by comparisons with a reference picture. The pictures are represented by appearance values. The apparatus may include means for transforming the appearance values of the pictures into the printing values and means, responsive to the printing values, for printing the image. The transforming means is such that the reference picture prints acceptably according to a predetermined standard. The apparatus also includes an appearance-value based display for the picture to be corrected in close proximity to a reference picture display. Additive color displays such as CRT s are examples of "appearance value based" displays. Advantageously, the reference picture and the picture to be corrected are displayed side by side on the same device. The system may further include means for correcting the picture to be corrected when both displayed pictures are viewed and compared and providing the appearance values of a corrected picture, so that when the appearance values of the corrected picture are transformed into printing values, the corrected pictures will print acceptably according to the preset standard.

Although pictures ca be adjusted for similarity even when their appearance on a display is quite dissimilar from the final printed result, the closed the appearance to the printed result, the more sensitive and accurate the adjustment will be. The display controls such as a cathode ray tube contrast and brightness controls are preferably set for comfortable viewing and a white reference provided, for example, on the cathode ray tube itself by using a white border and by filling all the space on the screen, i.e. between the pictures and in other areas not occupied by images, with reference white. Reference white is usually obtain on a screen by maximum file values of R, G and B. Preferably room light should not fall directly on the screen.

To achieve good results, it is necessary to select an appropriate reference picture. For example, it may not be possible to acceptably adjust a snow scene by using a night exterior scene as a reference. This is not so much a question of subject matter as its overall photographic similarity. Sunrise, morning, midday, sunset, evening and night scenes are distinctly different, as are closeups and distance views. Beach, city, country, closeups of people, are distinct categories. Overcast or sunny outdoor conditions at different seasons as compared to indoor scenes under artificial light must be considered. A variety of flesh tones should also be provided in the reference pictures in view of the importance of flesh tone to the appearance or impression of a picture. Preferably, reference pictures will contain memory colors to give viewers visual images that are consistent with their expectations. An important distinction is between high key, low key, and full range pictures, which relates to the range of gray tones in the image. Selection may be by a series of category choices as above or by visual selection from a panel of reduced versions of the pictures displayed on the cathode ray tube. The reference pictures may be indexed for ease of selection and access. According to one scheme the reference pictures may be indexed by key characteristics. The index can be queried for a reference picture with desired characteristics. According to an advantageous feature, a large number of different pictures of reference colors can be displayed at a typical cathode ray tube resolution to permit the operator to make the choice. Reference colors may be segregated for display by category.

The importance of memory colors is two-fold. Reference pictures with memory colors allow a user to adjust the ambient conditions of a monitor so that the appearance of the reference picture on the monitor matches the expected perception of the image to the user. This may be accomplished by the user-accessible monitor adjustment.

A second advantage of the use of memory colors is to permit the operator to select a reference picture which includes objects containing memory colors which may appear in the picture to be corrected. Rather than providing reference pictures of scenes which include a great number of memory-color items, it is possible to provide an additional reference library of memory-color images. The displayed reference may be a composite of a scenic reference picture and one or more reference memory colors so that during the adjustment process the user can insure correction and adjustment of the memory colors contained within the picture to be corrected. In constructing the reference composite only the memory colors contained in the picture to be corrected need be selected from a reference memory color library.

As discussed above, the adjustment to the picture to be corrected may be performed by turning a knob or its equivalent. This requires near-instantaneous computation of adjusted pictures and their subsequent display. To avoid instantaneous computation and to simplify operator control, a series of variants of the picture to be corrected may be precomputed and stored in a memory. Alternatively, a series of variants of the reference picture with adjustments in opposite directions may be precomputed and stored. Selection of the previously prepared variants to the reference picture will allow the user to adjust the reference display in order to match an unadjusted picture to be printed. Successive variations of characteristics and gradations of the reference picture will allow a user to match the overall visual impression of the reference picture to that of the picture to be printed.

Once the match is achieved, a reverse adjustment of the correction made to the reference signal will serve to properly adjust the picture to be printed. This reverse correction of a reference picture in order to determine the needed correction to the picture to be printed is equivalent to direct correction of a picture to be printed by matching the picture adjustment to a reference picture display. In order to avoid storing hundreds of variants of each reference picture the variants can be computed automatically as the operator makes the selection and the subsequent choices.

Inexpensive implementation of the adjustment process is possible in part because the three principal adjustments (brightness, contrast and color balance) can be carried out by three nonlinear transformations of the RGB signals fed to a cathode ray tube. These transformations may be carried out using nonlinear amplifiers. Preferably, each of the three nonlinear amplifiers is implemented digitally as a one-dimensional lookup table, which may have two hundred fifty-six 8-bit values stored. The act of modifying adjustment involves loading the lookup tables with new values. Contrast and brightness adjustments use the same transformation for the three signals while color balance adjustments involve different transformations of the three signals. All of the adjustments may be concatenated so that only a single transformation is required for each signal.

If saturation adjustment is also desired, appearance values such as the RGB signals are subjected to a $3 \times 3$ linear transformation into L, C1, C2 variables. U.S. Pat. No. 4,500,919 addresses saturation adjustment. Saturation adjustment is accomplished by subjecting C1 and C2 to nonlinear transformations. Alternatively, C1 and C2 can be transformed into polar coordinates hue (angle) and saturation (amplitude) and the saturation variable can be subjected to a nonlinear transformation. All of the transformations applied to the variables mentioned can be carried out as shown in The Journal of Imaging Technology, Schreiber, 12:200–211, Aug. 4, 1986.

The display system to which this invention is applied may already have three one-dimensional look up tables (LUT's). If so, they can be used. Other systems will be organized in 15 such a way that the adjustment module containing the LUT's can be plugged into the backplane, or bus, of the system. In very primitive systems, a hardware module can be inserted into the cable from the computer to the display, but in that case it will usually be necessary to add analog-to-digital and digital-to-analog converters in each of the three signal paths. The computation of the LUT contents can be carried out in software fast enough in most modern systems, but in case this is not possible, a hardware module can be provided as discussed in the aforementioned paper.

It is a further object to provide an enhanced color correction device with a selective color correction capability. When converting a natural image to a printed form, experienced photographers, color reproduction craftsmen and art directors know that several key features, elements or components in each picture may be exceedingly important to color correction procedures and compromises. Certain image components such as memory colors or key features require particular attention during conversion from an initial image capture medium, e g., a transparency, digital data from an image scanner, or video signals into colorant values that will control the application of ink or dye on the final substrate such as paper.

Key features are an extension of this concept. In a given composition, the nature, size and prominence of an element may dictate the importance of its proper rendition to ensure a pleasing, authentic look. Within any composition or scene, an experienced person will expect certain feature to look a certain way, for example, a wedding dress is expected to be white. The prominence or size relative to overall crop, foreground or background location of a feature in a composition may dictate very careful treatment to make the whole picture look acceptable. The lighting of a scene may indicate that one part of a subject's flesh/skin tone must be treated as a key feature.

According to the invention, memory color areas and the key features may be designated in the displayed reference images in order to guide a user in editing a picture. The designation can be a graphic overlay displayed via software commands which will indicate to the user the areas in the reference worthy of scrutiny. The user may be directed to examine the corresponding areas of the current picture in order to ensure these are treated correctly, an in accordance with advice in the form of written comments or voice messages that may be associated with each designated or group of designated features. The written comments may appear on a display and voice comments may be generated in a voice synthesizer.

The designations may be varied by software in accordance with a selected user experience level, a user request for more or fewer prompts or changes in the cropping or sizing of the reference picture. If a user trims off a reference picture and concentrates on a subarea, a new hierarchy or list of designations may be displayed.

Designated reference areas or pixels may be chosen by the user one at a time, by sequentially aiming a mouse-driven cursor or the equivalent. Alternatively, a plurality of images may be consecutively flashed on the screen and selected; each time a user makes a selection, he also designates a corresponding feature in the current picture. If the software shows a designation of sky or grass, the user may identify and indicate the sky and grass areas in a current picture with a cursor. Following such identification, the system performs selective color correction. The selective color correction may convert the color values of the current areas at close proximity to the selected pixels into corresponding color values identified in either the reference picture or a special color reference. For example, the special color may be a desired color of a sport uniform whose value may have been indicated by the user through keying in the desired appearance (RGB) value, or by referring to a standard color name such as Pantone No. A, B, or C; Coca Cola red; etc. The selected correction areas may be designated by spatial or color proximity or by a special function defined by the set of spatially contiguous areas within a specific color range. Advantageously, the corrected appearance values are mapped in a fashion correlated to the uncorrected appearance values.

Area selection may alternatively be affected by utilization of a mask. This may be accomplished by a software generated frame designating a predetermined area. The frame may be created through a variety of different methods, including using a mouse driver cursor to draw the frame or to place and modify preconfigured rectangular, circular or elliptic frames. Additionally, the frame may be generated by selecting one or more pixels and including all adjacent, continuous or spatially proximate pixels having the same or similar color.

It is a further object to provide a color correction system for a color reproduction unit. Color reproduction units such as currently available color photocopy devices often require extensive operator interactions and adjustments in order to achieve an acceptable reproduction. Frequently, several initial copies must be made and the controls adjusted in order to begin to correct the appearance of the output. Often many "proofs" must be made prior to achieving adequate appearance.

According to an advantageous feature of the invention, an original to be reproduced may be presented to a photocopy unit. The photocopy unit may produce a plurality of variants on a single sheet. The variants should be of reasonable size to allow a user to evaluate the color impression. Advantageously, six variants may be displayed on an A4 or A sheet page. This single sheet may be considered a proof sheet. The operator may select the desired variant. In response to the selection, the reproduction control is set to an appropriate image modification to give a reproduction corresponding to the selected variant. The reproduction may then be generated as if the adjustments had been performed through the conventional manual adjustment routine. Advantageously, only a single "proof" is required resulting in a substantial savings of paper, toner or other colorant as well as machine wear and tear.

DETAILED DESCRIPTION OF THE PREFERRED EMBODIMENT

In order to more clearly describe the invention and the preferred embodiment, descriptions of certain features are provided at the outset. The names of these features are meant to be descriptive and their makeup according to the preferred embodiment will be apparent from the following descriptions thereof.

An image appearance adjustment device may be a mechanism which alters appearance values of one or more color areas. A variable device may be controlled to change the degree and type of adjustment.

A multiple variant image appearance generator may be a mechanism which generates two or more modified appearance images. Advantageously the modified appearance images are distributed over a predetermined range of image adjustments. A variant selector may be used in connection with a multiple variant image appearance generator to allow a user to select one of the generated modified appearance images.

Special and selective color correction are terms of art as set forth in U.S. Pat. No. 4,500,919.

A white signal generator produces an appearance value signal which may be displayed as a predetermined reference white.

Standard description appearance value data is a digital representation of appearance values of a picture in a standard color space such as CIE LAB or CIE XYZ.

Figure 1:
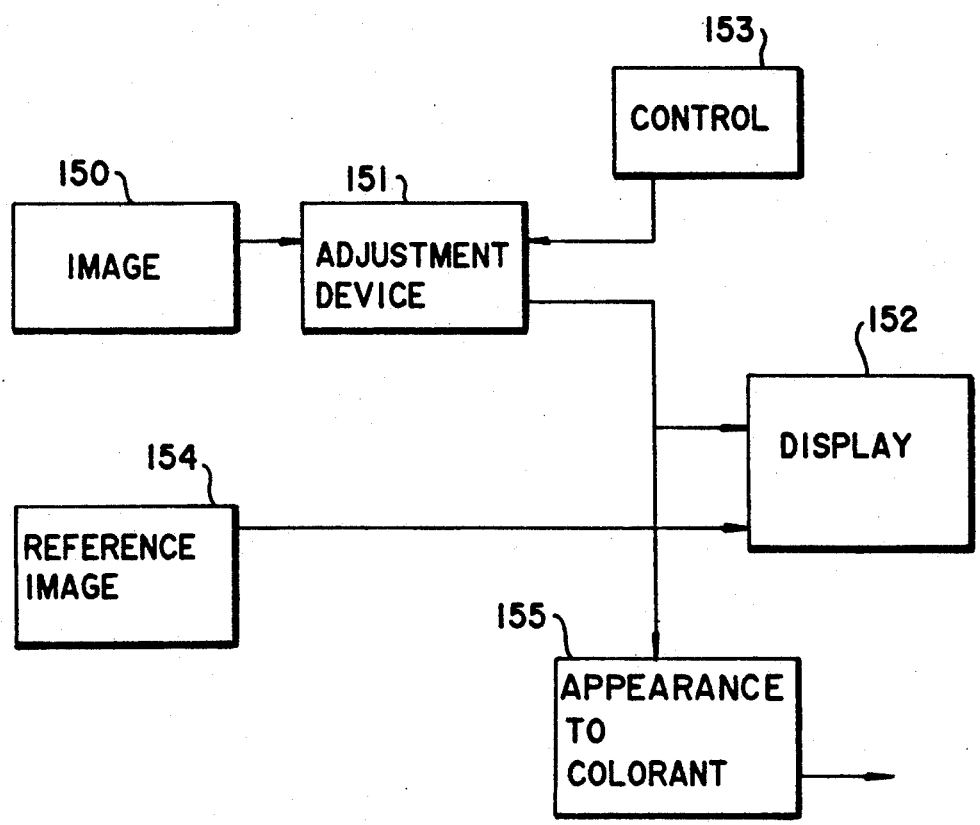
FIG. 1 is a diagram of a color correction system according to the invention.

FIG. 1 shows a diagram of a correction system according to the invention. A digital image 150 is passed to an adjustment device 151. Advantageously tristimulus appearance values represent the image. The adjustment device acts to modify the appearance values and output the modified values to a display 152. A modification control 153 is connected to the adjustment device 151. The modification control 153 sets the configuration of the adjustment device 151. The adjustment device can adjust the image by modification of parameters or characteristics such as brightness, contrast, hue, saturation, etc. The adjustment can be varied by the modification control 153. A reference image 154 is passed to the display 152. The reference image is stored in a memory. The adjusted image from the adjustment device 151 is displayed proximately to the reference image 154 on the display 152. The adjustment control 153 may be tuned so that the overall visual impression of the image 150 as modified, approximates that of the reference image 154 as displayed by the display 152. When the visual impression of the modified image is similar to that of the reference image, the visual impression of the printed modified image will be similar to that of the printed reference image.

According to an advantageous feature, the image 150 is interactively modified. The adjustments are rapidly made apparent on the display 152. The modified image produced by the adjustment device may be transmitted to an appearance-to-colorant conversion unit 155. The appearance values must be transformed to colorant values in order to print the image. The appearance-to-colorant conversion unit 155 may be connected to a printer engine not shown in FIG. 1.

Figure 2:
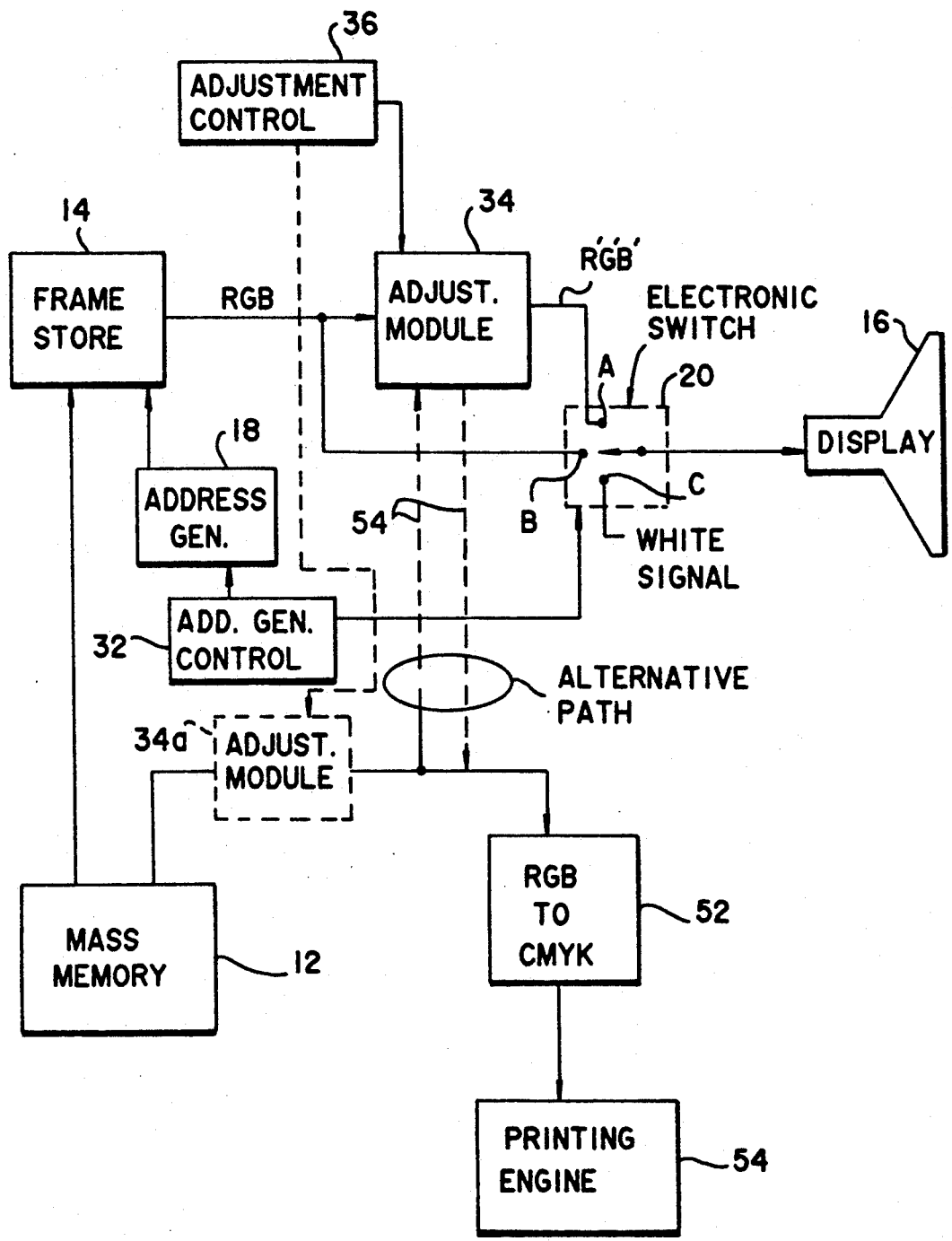
FIG. 2 is a block diagram of a color correction and reproduction system to illustrate the invention.

FIG. 2 is a detailed block diagram of a color correction and reproduction system to illustrate the invention. The system includes a mass memory 12 for storing appearance values of the image to be corrected and appearance values of the reference images. Advantageously a plurality of reference images may be stored. Each reference picture may represent a different scene genus which gives a specific overall impression. Examples of reference images may be a daylight outdoor scenery view, a low-light portrait, a fluorescent-lighted indoor scene, etc. A reference picture displaying a scene corresponding to the picture to be corrected is selected. The appearance values of the pictures may simply be RGB values of the pictures. The RGB values of the picture to be corrected and of one or more reference pictures may be loaded into a frame store 14 connected to the mass memory 12.

The frame store 14 may be adapted to store low resolution RGB values suitable for display on a cathode ray tube (CRT) or other display 16. The high resolution of the data contained in mass memory 12 is not needed for the display during the image adjustment operation. Address generator 18 generates the appropriate addressing signals to fetch the RGB values of the picture to be corrected and of one or more reference pictures on a pixel-by-pixel and line-by-line basis and supplies the data to the display through a switch 20. Normally the reference image data will be applied to the display 16, bypassing the adjustment module 34. A control 32 controls the address generator 18 and switch 20 to display the images as required. In actual implementation of the system the switch 20 is integrated into the adjustment module 34. The switch 20 and adjustment model 34 are shown as separate units in FIG. 2 for the sake of illustration.

In order to supply reference white, a white signal may be applied to terminal C of switch 20. The switch 20 may be controlled by control 32 such that the white signal is selected at the border and all spaces on the screen between pictures and other areas not occupied with pictures. It may be advantageous to place a screen memory between the switch 20 and the display 16.

The RGB data from frame store 14 may be applied to the display 16 through two paths: one through an adjustment module 34 and the other bypassing the module. Adjustment module 34 permits an operator to adjust the RGB values of the picture to be corrected through a control 36. The control may be direct acting controls such as knobs or computer driven such as by a mouse or a cursor on a screen. Control 32 controls the switch 20 so that the adjusted RGB values of the picture to be corrected are selected from terminal A and the unadjusted RGB values of the reference pictures present are selected from terminal B, each being are selected for display at the appropriate portion of the screen. Adjustment module 34 may permit adjustment of at least brightness, contrast and color balance of the picture to be corrected. Other adjustments are possible. The module 34 may be of a construction similar to the color translation module illustrated and described in FIG. 3 of U.S. Pat. No. 4,500,919 and the accompanying description.

Frequently, it will be desirable to move the pictures displayed on the screen. This is best done in the address generator 18 or a frame buffer, rather than recomputing the contents of the frame store. Alternatively, two frame stores may be used, one with the reference picture(s) and one with a picture(s) to be corrected.

The picture to be corrected may be of much higher resolution (samples per frame) than the display. A display resolution version of the picture to be corrected may be derived from the high resolution data and stored in the frame store 14. This can be done by simple subsampling (taking every nth point per line and every nth line per frame) or by a more elaborate process that involves low-pass spatial filtering before subsampling. There may be a one-to-one correlation between addresses in the frame store 14 and picture elements on the display screen. The reference picture(s) may also be placed in the frame store directly. The remainder of the screen is set to reference white by feeding the appropriate signal from a reference source.

Correction is effected by effectively mapping the color space. That is, each set of three numbers describing a color is changed to a new set of three numbers. One method to print a corrected picture is to transmit the data from the file of the picture to be corrected in the mass memory 12 through the adjustment module 34 to the RGB to CMYK conversion unit 52 during the output process when the printing engine is forming the output image. In an alternative method, the picture to be corrected is modified in the mass memory 12 and then transmitted directly from mass memory 12 to the color conversion unit 52 during the output process. Normally, one would not actually modify the file, but make a second file with modified values. This can be done by passing the data through the adjustment module from the uncorrected to the corrected file.

The adjustment may include brightness, contrast and color balance adjustments only, which requires three separate nonlinear transformations. These can be implemented in 3 one-dimensional look-up tables, either in software or in hardware.

The RGB values of the picture to be corrected may be adjusted in the same manner as performed in module 34 to obtain high resolution adjusted RGB values suitable for printing purposes. A second adjustment module 34a may be connected to the mass memory 12 in order to adjust the high resolution data representing the picture to be corrected. The second adjustment module 34a may be connected to the control 36 so that the image to be printed is corrected in the same fashion as the interactively adjusted low resolution image. Alternatively, the high resolution RGB values of the picture to be corrected may be adjusted using module 34 when the values are transmitted to the conversion module 52, as shown by dotted lines 54. Advantageously the conversion unit 52 is located in the printer and is tailored to the printing or reproduction characteristics of the output device or printer. Alternatively, the conversion may take place outside of the printer and CMYK values may be transmitted into the output device. The appearance values or RGB are in a known color space, and a device-tailored conversion located in the output device yields an output-device dependent color translation. The conversion in unit 52 may be performed in a manner described in U.S. Pat. No. 4,500,919. The printing values CMYK are then supplied to printing engine 54 for printing the picture. If the conversion to colorant is effected outside the output device, such as when separations are generated in an editing station, the conversion should still be tailored to the particular output device or type of output device in order to compensate for process specific characteristics of the paper, inks and printer.

The mass memory 12 contains a representation of the appearance values of the reference pictures. The conversion unit 52 is configured to transform the appearance value color space of the reference pictures to colorant values which yield an acceptable appearance when printed by the print engine 54. The adjustment modules 34 or 34a operate to modify the appearance values of the picture to be corrected by transforming the appearance values to yield a visual impression corresponding to the reference picture. Once the appearance values of the picture to be corrected have been modified, the appearance to colorant conversion of unit 52 will give colorant amounts which will print acceptably. According to a particularly advantageous feature the reference picture color space may be or correspond to a standard color space such as CIEXYZ or CIE LAB.

Figure 3:
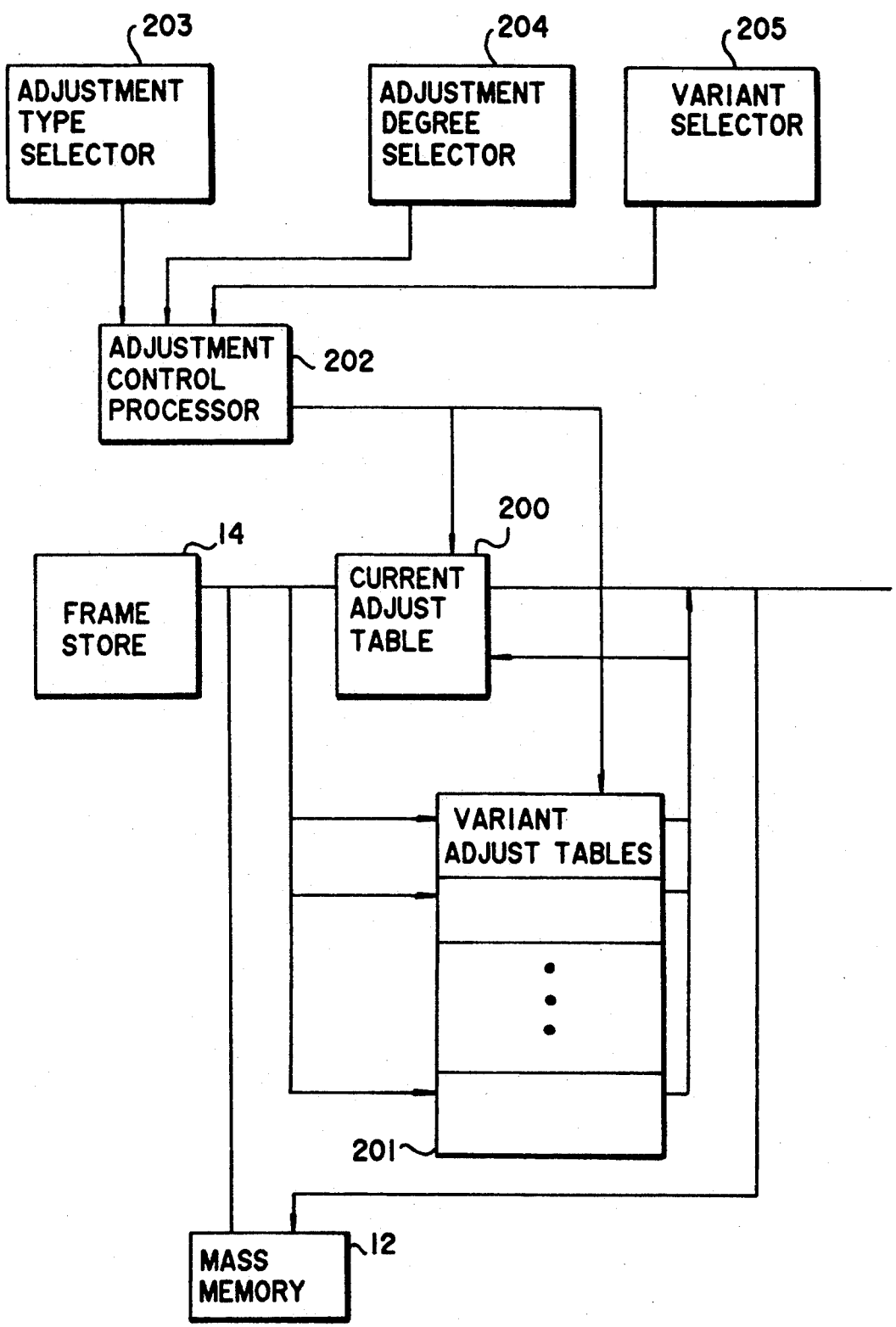
FIG. 3 is a schematic of a color adjustment device.

FIG. 3 shows an embodiment of an adjustment device. The embodiment of FIG. 3 is based on modifying images using lookup tables or their equivalents. The lookup table entries may be changed in order to affect the modification. The system of FIG. 3 may be implemented through digital hardware or more conveniently, through software. The frame store 14 may contain a digital representation of the image to be corrected on and one or more reference images. The digital representation is in the form of appearance variables. The frame store 14 may be connected to a mass memory 12 which stores high resolution versions of the images to be corrected and a library of reference images. One or more of the reference images may be loaded into the frame store 14 or a frame buffer (not shown). The frame store 14 and mass memory 12 are connected to the current adjust table 200 and the variant adjust table 201. A "current variant" is an image as modified by the current adjust table 200. "Available variants" are images as modified by the variant adjust tables 201. The image appearance modification may be affected advantageously by lookup tables. The digital representation of the appearance values represent the addresses for the lookup tables. The lookup table contents are the modified appearance variables. The degree of adjustment may be altered by loading different values into the lookup tables. The lookup tables 200, 201 are connected to an adjustment control processor 202 for this purpose. The adjustment control processor is responsive to an adjustment type selector 203, an adjustment degree selector 204 and a variant selector 205. The adjustment type Selector 203 Selects the color parameter or characteristic being modified. The parameter or characteristic selected may be brightness, contrast, color balance, saturation, hue, etc. Certain characteristics such as saturation and hue may be modified by a multidimensional lookup table or its equivalent.

The adjustment degree selector 204 may be utilized to control the amount of adjustment of the parameter or characteristic being modified. According to an advantageous feature, the adjustment degree may be coarse, medium, and fine. Alternatively, the adjustment degree may be a continuously variable amount set by the selector.

During operation, the image from the frame store 14 is modified by the current adjust table 200. Initially, the current adjust table may be set for a zero adjustment. The variant adjust tables 201 serve to generate a series of modified images for display on the monitor. The display of the current variant and available variants are displayed in proximity to a reference image on a display. The display may be a CRT or other color display unit. According to an advantageous embodiment, six available variants may be displayed. The image bearing the closest visual impression to the reference image may be selected by user through variant selector 205. The adjustment control processor 202 loads the entries from the selected variant adjust table into the current adjust table in response to the variant selector 205 if one of the available variants rather than the current variant is selected. Advantageously, the adjust table outputs may be connected to a display and/or an appearance to colorant conversion unit which in turn is connected to a print engine.

The user may instruct the system to continue to create additional suggested modification and current image substitutions until satisfied that the impression of the current image matches the impression of the reference image. According to a preferred embodiment, the modifications may be generated changing only a single appearance characteristic. Different characteristics may be modified after each successive correction and replacement. Characteristics which may be modified include brightness, contrast and color balance. Additional characteristics may include hue and saturation.

Additionally, each characteristic may be adjusted using several step with successively smaller differences between the choices in successive steps.

For example, when correcting a characteristic a coarse modification can be carried out by generating six available variants of $-30\%$, $-20\%$, $-10\%$, $+10\%$, $+20\%$ and $+30\%$. The closest of the suggested variants may be selected and designated as the current variant. Next a fine adjustment of the same characteristic may be effected by generating and displaying available variants at $-6\%$, $-4\%$, $-2\%$, $+2\%$, $+4\%$ and $+6\%$. The appropriate variant may be selected and designated as the current variant. Successively smaller differences may be used until the desired impression is reached and the characteristic is matched. Advantageously, coarse adjustments may be made for a set of characteristics before the fine adjustments are made. According to another feature, the user may select the order of characteristics and adjustment degree. The percent modification are given by way of example. Those or ordinary skill will be able to select other adjustment modifications without departing from the spirit or scope of the invention.

The variant selector 205, adjustment control processor 202, current adjust table 200 and variant adjust table 201 may be located in an output stage of a color photocopy device. The adjust table may be utilized to generate a series of variant "proofs", one of which may be subsequently selected to yield an acceptably printed reproduction an image. The tables may be utilized to modify any transformation of appearance variables.

Figure 4:
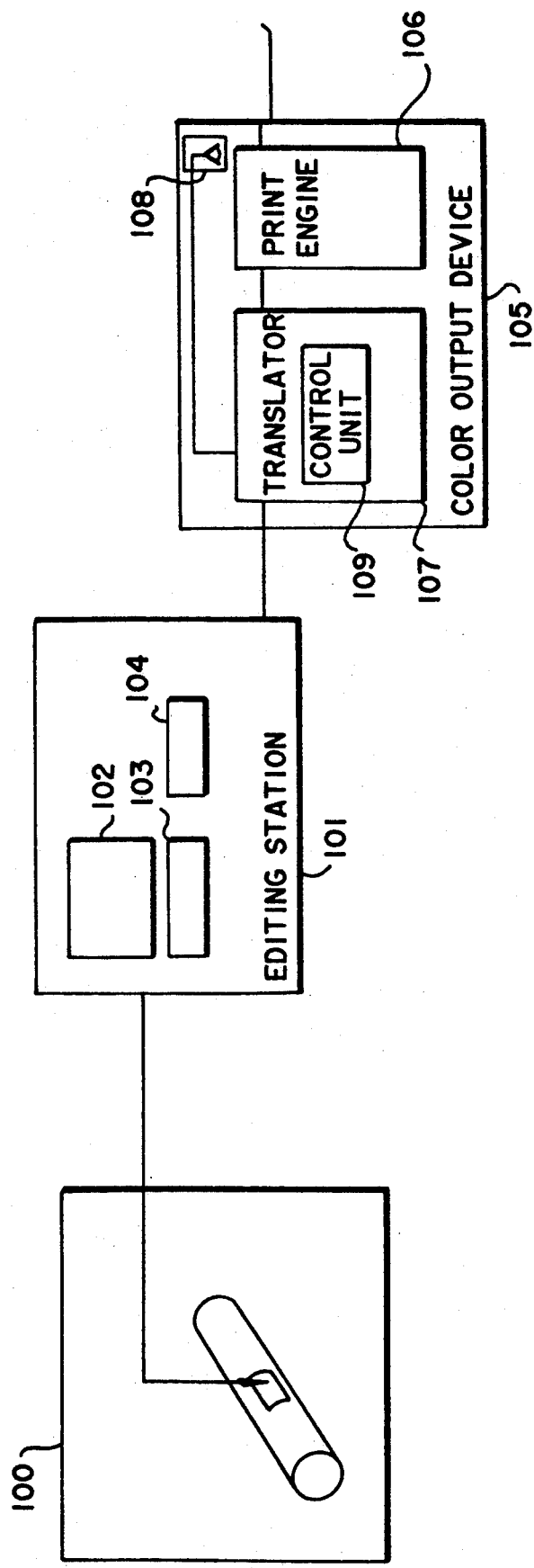
FIG. 4 is a schematic of a color correction and reproduction system.

FIG. 4 shows a preferred system configuration. A scanner 100 may be provided for an image input. The image may be a photograph, original print, film or any other scanner-readable image. The scanner 100 may be a tristimulus scanner which will separate and transmit RGB or appearance value signals to an editing station 101. The editing station 101 is provided in order to allow a user to effect various color corrections and modifications as may be desired or advantageous for the image to be reproduced. The editing station 101 includes a display 102. The display may be a CRT or any other display. According to an advantageous feature, the display is an appearance variable compatible display. The editing station may further include a keyboard 103 and/or a mouse 104 for user interaction. The editing station 101 may advantageously be connected to a color output device 105. The color output device 105 is advantageously a color photocopy device output section such as a color ink jet printer engine. Alternatively, the output device 105 may be color film recorder, or other color reproduction device. A color photocopy device output section is functionally equivalent to a color printer. The color output device will include a print engine 106 which is responsive to colorant value inputs in order to generate an output print. According to a preferred feature, the editing station modifies the appearance variables and transmits appearance variables such as a tristimulus set to a color translator 107. Calibrated RGB, CIE XYZ and CIE LAB are examples of standard tristimulus sets. The translator 107 will transform the appearance values into appropriate colorant values in order to achieve the desired result from the print engine. The translator 107 may be implemented by look-up tables. According to a particularly advantageous feature, a sensor such as a scanner, photodetector or calibration stabilization sensor 108 may be provided in the output path of the print engine. The translator 107 may include a control unit 109 which generates a digital representation of a test image. The test image may be periodically printed by print engine 106 either automatically or on command and scanned by sensor 108 to measure color densities. The scanner output can be utilized to control calibration adjustment of the output device. One method is to compare the scanner output to a previously stored expected output and to adjust the print engine characteristics in order to stabilize the printer output based on the comparison. Alternatively a look-up table may be utilized to modify either the colorant values or the tristimulus sets of appearance values. Printer output stabilization is advantageous in that commonly available printers are unstable and their output characteristics vary perceptibly over time and use due to environmental conditions and wear on the unit components. If the output characteristics have deviated more than a predetermined amount from an ideal than an indication may be provided to the user that a service call is needed.

In the above color correction processes, the display need not be accurately calibrated and the viewing conditions under which the operator views the display need not be exactly controlled. The picture to be corrected can be corrected by making adjustments until its visual impression resembles the visual impression of the reference picture on the screen even though the impression of the reference picture displayed may differ substantially from the impression of the reference picture as printed by engine 54.

We claim:
1. A color correction system comprising:
 a first image appearance value storage device containing a first set of appearance values which represent a first color image and wherein appearance values are values that represent color and that are RGB values or may be obtained by a reversible transformation of RGB values;
 a variable image appearance value adjustment device connected to said first image appearance value storage device;
 an image display connected to said variable image appearance value adjustment device;
 a second image appearance value storage device containing a second set of appearance values which represent a second color image connected to said display; and
 an appearance value to colorant value converter connected to said variable image appearance value adjustment device.
2. A color correction system according to claim 1, wherein said variable image appearance value adjustment device is a user interactive device.
3. A color correction system according to claim 2 further comprising:
 a third image appearance value storage device connected between said variable image appearance value adjustment device and said display.
4. A color correction system according to claim 2, wherein said variable image appearance value adjustment device further comprises a multiple variant image appearance generator and a variant selector connected to said generator.
5. A color correction system according to claim 4, wherein said variable image appearance value adjustment device further comprises a selective color correction device.
6. A color correction system according to claim 5, wherein said variable image appearance value adjustment device further comprises a special color correction device.
7. A color correction system according to claim 6 further comprising a white appearance signal generator connected to said display.
8. A color correction system according to claim 7 further comprising:
 an address generator connected to said first and second image appearance value storage devices;
 a control connected to said display; and wherein
 said display further comprises a switch connected to said variable image appearance value adjustment device, said second image appearance value storage device and said white appearance signal generator, wherein said address generator and said switch are responsive to said control.
9. A color correction system according to claim 2 further comprising:
 an address generator connected to said first and second image appearance value storage devices;
 a switch connecting said variable image appearance value adjustment device and said second image appearance value storage device to said display, wherein said address generator and said switch are responsive to a control.
10. A color correction system according to claim 2, wherein said variable image appearance value adjustment device comprises at least one nonlinear amplifier of appearance values.
11. A color correction system according to claim 10, wherein said nonlinear amplifier is a lookup table.
12. A color correction system according to claim 10, wherein said variable image appearance valve adjustment device comprises three one-dimensional lookup tables.
13. A color correction system according to claim 12, wherein each of said one dimensional lookup tables is independently variable and corresponds to one signal of a set of appearance signals.
14. A color correction system according to claim 2 further comprising a gamut monitor connected to said variable image appearance value adjustment device.
15. A color correction system according to claim 8, wherein said control comprises means for repositioning images on said display.
16. A color correction device comprising:
 a primary image appearance value adjustment unit connected to an image source, wherein appearance values are values that represent color and that are RGB values or values that may be obtained by a reversible transformation of RGB values;
 a plurality of variant image appearance value adjustment units connected to said image source;

an adjustment selector connected to said primary image adjustment unit and said variant image adjustment units;

an appearance value to colorant value converter connected to said primary image appearance value adjustment unit.

17. A color correction system according to claim 16, wherein said image source is an image storage device.

18. A color correction system according to claim 16, wherein said image source is a scanner.

19. A color correction system according to claim 16 further comprising means for printing a plurality of images, said means for printing responsive to at least one of said variant image adjustment units.

20. A color correction system according to claim 16, wherein said adjustment selector further comprises an adjustment controller connected to said variant image adjustment units.

21. A color correction system according to claim 20, wherein said adjustment selector unit further comprises a variant selector connected to said adjustment controller.

22. A color correction system according to claim 21, wherein said variant image adjustment units are connected to said primary image adjustment unit.

23. A color correction system according to claim 22, wherein said adjustment selector further comprises an adjustment type selector connected to said adjustment controller.

24. A color correction device according to claim 23, wherein said adjustment selector further comprises an adjustment amount selector connected to said adjustment controller.

25. A color correction device according to claim 24 further comprising a display connected to said image adjustment units.

26. A color correction device according to claim 25 further comprising a reference image source connected to said display and said display is configured to display said variant images and said reference image.

27. A system according to claim 16 further comprising a print engine connected to said appearance value to colorant value converter.

28. A system according to claim 27, wherein said reference image source comprises means, connected to said display, for storing a plurality of reference images; and means, connected to said means for storing, for selecting at least one of said reference images.

29. A system according to claim 28, wherein said means for selecting further comprises means for indexing said reference images.

30. A system according to claim 29, wherein said means for indexing comprises means for indexing by characteristics.

31. A method for adjusting color images comprising the steps of:

displaying a first image on a display device, said first image being represented by a first plurality of appearance values, wherein appearance values are values that represent color and that are RGB values or values that may be obtained by a reversible transformation of RGB values;

displaying a second image on a display device, said displaying of said second image being proximate to said first image;

modifying at least a subset of appearance values in said first plurality of appearance values so that a visual impression of said first image is comparable to a visual impression of said second image such that a modified first plurality of appearance values is created;

converting said modified first plurality of appearance values to a plurality of corresponding colorant values.

32. A method according to claim 31 further comprising the step of:

storing a high resolution version of said first image;

said step of displaying said first image comprises the steps of generating a low resolution version of said first image and displaying said low resolution version;

said step of modifying comprises interactively modifying said low resolution version of said first image and when satisfied modifying said high resolution version of said first image; and said step of converting comprises converting a modified high resolution version of said image appearance values to colorant values.

33. A method according to claim 31, wherein the step of modifying comprises the step of sequentially modifying a series of image characteristics.

34. A method according to claim 32, wherein the step of modifying comprises the steps of:

setting a current modification of said first image;

generating a plurality of variant modifications;

displaying said current modification and said variant modifications;

selecting a modification and replacing the current modification with the selected modification when the selected modification is one of said variant modifications.

35. A method according to claim 34, wherein the step of modifying comprises sequentially modifying a series of characteristics.

36. A method according to claim 34 where the step of modifying is an iterative step where a first iteration of the generating step generates a plurality of coarse variant modifications and in one or more subsequent iterations the generating step generates successively finer variant modifications.

37. A method according to claim 31, further comprising the step of displaying one or more additional images.

38. A method according to claim 31, wherein said step of modifying further comprises the step of selective color correction.

39. A method according to claim 38, wherein said step of modifying further comprises a step of special color correction.

40. A method according to claim 33, wherein said step of modifying further comprises the steps of:

sampling one or more points of said first image;

selecting a set of points proximate to said sampled points;

sampling one or more points of said second image;

modifying said set of points of said first image in accordance with the appearance values of said points sampled from said second image.

41. A method according to claim 40, wherein said step of selecting a set of points proximate to said sampled points comprises selecting a spatially proximate set of points.

42. A method according to claim 41, wherein said step of selecting comprises selecting a set of points having proximate color values.

43. A method according to claim 42, wherein the step of selecting comprises selecting a set of spatially contiguous points having proximate color values.

44. A method according to claim 31, wherein the step of displaying said second image comprises displaying a second image in the same class as said first image and which is known to print acceptably.

45. A method according to claim 32, wherein said step of modifying said high resolution version o said first image effects the same modifications as the step of modifying said low resolution version.

46. A method according to claim 31, wherein said step of modifying further comprises a step of special color correction.

47. A method according to claim 31, wherein the step of displaying said second image comprises the step of displaying an image intended to appear on the same page as said first image.

48. A method according to claim 32, wherein said step of modifying comprises modifying brightness, contrast and color balance of said first image.

49. A picture correction apparatus comprising:
an image data file containing a collection of standard description appearance value data representing one or more pictures wherein appearance value data are values that represent color and that are RGB values or values that may be obtained by a reversible transformation or RGB values;
means for modifying appearance value data of a picture so that said picture has an overall visual impression comparable to that of a reference picture when displayed;
means for transforming appearance value data into colorant values capable of transforming appearance value data of said reference picture into colorant values that will print acceptably according to a predetermined standard.

50. A picture correction apparatus according to claim 49, wherein said image data file is compatible with image data derived from different sources and wherein said colorant values are in a standard format and said means for transforming is configured for a specific type of print engine to print correctly according to a predetermined standard 51. A method according to claim 31, wherein the step of modifying comprises the steps of:
setting a current modification of said first image;
generating a plurality of variant modifications;
displaying said current modification and said variant modifications; and
selecting a modification and replacing the current modification with the selected modification when the selected modification is one of said variant modifications.

52. A method according to claim 51, wherein the step of modifying comprises sequentially modifying a series of characteristics.

53. A method according to claim 51, wherein the step of modifying is an iterative step where a first iteration of the generating step generates a plurality of coarse variant modifications and in one or more subsequent iterations the generating step generates successively finer variant modifications.

54. A method according to claim 40, wherein said step of selecting comprises selecting a set of points having proximate color values.

55. A method according to claim 31, wherein said step of modifying further comprises the steps of:
sampling one or more points of said first image;
selecting a set of points proximate to said sampled points;
sampling one or more points of said second image; and
modifying said set of points of said first image in accordance with the appearance value of said points sampled from said second image.

56. A method according to claim 55, wherein said step of selecting a set of points proximate to said sampled points comprises selecting a spatially proximate set of points.

57. A method according to claim 55, wherein said step of selecting comprises selecting a set of points having proximate color values.

58. A method according to claim 57, wherein the step of selecting comprises selecting a set of spatially contiguous points having proximate color values.

59. A method for reproducing an original color image in a desired state with a color reproduction system comprising the steps of:
displaying an original image on a display device, wherein said original image is represented by original image appearance values, wherein a visual impression of said displayed original image is not constrained to match, according to a predetermined standard for matching visual impression, a visual impression of the original image and is not constrained to match, according to a predetermined standard for matching visual impression, a visual impression of the original image when printed using colorant values converted from said original image appearance values, and wherein appearance values are values that represent color and that are RGB values or values that may be obtained by a reversible transformation of RGB values;
displaying a reference image on a display device, wherein said reference image is represented by reference image appearance values, wherein there is a known relationship between said reference image appearance values and a corresponding set of colorant values that would print an image with a predetermined visual impression, wherein said relationship is defined by a predetermined transformation, and wherein a visual impression of said displayed reference image is not constrained to match, according to a predetermined standard for matching visual impression, said predetermined visual impression; and
adjusting said original image appearance values such that the visual impression of the display of said adjusted original image appearance values matches the visual impression of said displayed reference image, according to a predetermined standard for matching visual impression.

60. A method for reproducing an original color image in a desired state according to claim 59, wherein said step of displaying an original image and said step of displaying a reference image are on the same display device.

61. A method for reproducing an original color image in a desired state according to claim 60, further comprising the step of:
converting said adjusted original image appearance values to colorant values by subjecting said adjusted original image appearance values to said predetermined transformation.

62. An image processing system comprising:
  means for receiving a first plurality of appearance values representing a first color image wherein appearance values are values that represent color and that are RGB values or values that may be obtained by a reversible transformation of RGB values;
  means for receiving a second plurality of appearance value representing a reference color image;
  a display device coupled to said means for receiving a first plurality of appearance values and coupled to said means for receiving a second plurality of appearance values;
  means for varying at least a subset of appearance values in said first plurality of appearance values such that a modified first plurality of appearance values is created;
  means for converting an appearance value to a colorant value, said means for converting being responsive to said modified first plurality of appearance values.

63. An image processing system according to claim 62 wherein said first color image and said reference color image are displayed on said display device using said first plurality of appearance values and said second plurality of appearance values respectively;
  wherein said means for receiving a first plurality of appearance values comprises at least an image storing device;
  wherein said means for receiving a second plurality of appearance values comprises at least an image storing device; and
  wherein said means for varying is used to vary said subset of appearance values to cause a visual impression of said color image on said display device to match a visual impression of said reference color image on said display device.

64. An image processing system according to claim 63 wherein said means for converting is coupled to said means for receiving a first plurality of appearance values and said means for varying.

65. An image processing system according to claim 63 wherein said means for converting converts said second plurality of appearance values to colorant values which would print an image of said reference color image with a predetermined visual impression.

66. An image processing system for editing a color image, said system comprising:
  a display device;
  means for generating and displaying on said display device a plurality of varied images of a color image from a first plurality of appearance values which represent said color image, said means for generating and displaying coupled to said display device and wherein appearance values are values that represent color and that are RGB values or values that may be obtained by a reversible transformation or RGB values;
  means for selecting one of said plurality of varied images, said one of said plurality of varied images having an associated modification of at least a subset of appearance values in said first plurality of appearance values and said means for selecting is coupled to said means for generating and displaying, said associated modification providing a modified first plurality of appearance values;
  means for converting said modified first plurality of appearance values into a corresponding plurality of colorant values.

* * * * *

UNITED STATES PATENT AND TRADEMARK OFFICE
CERTIFICATE OF CORRECTION

PATENT NO. : 5,212,546

DATED : May 18, 1993

INVENTOR(S) : Efraim Arazi, William F. Schreiber, Abraham A. Bar

It is certified that error appears in the above-identified patent and that said Letters Patent is hereby corrected as shown below:

Column 17, claim 28, line 1, change "27" to --26--.

Signed and Sealed this

Twenty-second Day of March, 1994

Attest:

BRUCE LEHMAN

Attesting Officer    Commissioner of Patents and Trademarks